(12) United States Patent
Canora et al.

(10) Patent No.: US 8,947,238 B2
(45) Date of Patent: Feb. 3, 2015

(54) SYSTEM AND METHOD FOR MULTI-MEDIA EXPERIENCE CAPTURE AND DATA TRANSFER

(75) Inventors: David Canora, Winter Garden, FL (US); Shannon Richard Monroe, Windermere, FL (US); Peter Stepniewicz, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 549 days.

(21) Appl. No.: 13/298,592

(22) Filed: Nov. 17, 2011

(65) Prior Publication Data

US 2013/0127589 A1    May 23, 2013

(51) Int. Cl.
| | | |
|---|---|---|
| G08B 23/00 | (2006.01) | |
| G05B 19/00 | (2006.01) | |
| H04N 7/18 | (2006.01) | |
| H04W 4/00 | (2009.01) | |
| H04L 29/08 | (2006.01) | |

(52) U.S. Cl.
CPC ................. *G05B 19/00* (2013.01); *H04N 7/18* (2013.01); *H04W 4/00* (2013.01); *H04N 7/181* (2013.01); *H04L 67/12* (2013.01)
USPC .... 340/573.1; 463/40; 455/456.1; 455/456.6; 318/66

(58) Field of Classification Search
CPC ..... A63F 13/12; A63F 2300/406; A63G 7/00; G07F 17/32; H04L 67/18; H04W 4/02; H04W 4/021–4/028
USPC ........ 463/40; 455/127.4, 456.1, 456.6, 553.1, 455/41.1, 41.2
See application file for complete search history.

(56) References Cited

U.S. PATENT DOCUMENTS

| | | | | |
|---|---|---|---|---|
| 6,060,847 | A | * | 5/2000 | Hettema et al. ................. 318/66 |
| 2005/0053066 | A1 | * | 3/2005 | Famolari ........................ 370/389 |
| 2007/0106484 | A1 | | 5/2007 | Sweatman et al. |
| 2008/0019317 | A1 | * | 1/2008 | Vellanki et al. ............... 370/331 |
| 2010/0303128 | A1 | * | 12/2010 | Isley ............................. 375/132 |
| 2012/0269133 | A1 | * | 10/2012 | Hansen ......................... 370/328 |

* cited by examiner

*Primary Examiner* — Brian Zimmerman
*Assistant Examiner* — Laura Nguyen
(74) *Attorney, Agent, or Firm* — Pillsbury Winthrop Shaw Pittman LLP (57) ABSTRACT

A system and method for multi-media experience capture and data transfer includes a system for transferring data including a first wireless communication system located on a moveable amusement attraction, a second wireless communication system located on the moveable amusement attraction, and logic to operate the first wireless communication system and the second wireless communication system based on a changeable parameter of the moveable amusement attraction.

21 Claims, 7 Drawing Sheets

SYSTEM AND METHOD FOR MULTI-MEDIA EXPERIENCE CAPTURE AND DATA TRANSFER

BACKGROUND

Entertainment experiences continue to gain popularity with ride or attraction-based experiences becoming more and more popular at entertainment venues, such as theme parks. In addition to the ride or attraction, there are a number of ways of enhancing the entertainment experience for a guest. For example, it is possible to generate and make available to a guest at the end of the ride or attraction multi-media data, examples of which include, but are not limited to, still pictures, video data, audio data, etc. An example of such multi-media data is an audio/video recording of the guest while they were on the ride or attraction. As more and more data sources are provided on the ride or attraction, the amount of data that is transferred during the relatively short period of time of the ride or attraction experience begins to overwhelm the available infrastructure and existing data transfer technologies.

For example, using the example of a moving ride, such as a roller coaster, the multi-media data is typically downloaded from the ride to a receiving element in the station while the ride is stationary, i.e., between rides. Unfortunately, this period of time is relatively brief, usually on the order of one or two minutes. Such a brief period of time may not be adequate for the large amounts of data currently being generated and collected during the ride. Therefore, a new way of transferring large amounts of multi-media data in a short period of time is needed.

SUMMARY

Embodiments of the invention include a system for transferring data comprising a first wireless communication system located on a moveable amusement attraction, a second wireless communication system located on the moveable amusement attraction, and logic to operate the first wireless communication system and the second wireless communication system based on a changeable parameter of the moveable amusement attraction.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The system and method for multi-media experience capture and data transfer is described below in the context of an amusement park ride, or an amusement attraction, in which it is desirable to capture the riders' experience on the ride using video, audio, and other data, transfer the captured data, and create a multi-media remembrance available to the rider in the form of a recorded disk, memory element or the like. However, the system and method for multi-media experience capture and data transfer can be implemented in other amusement experience attractions and venues, such as an interactive experience, or the like.

As used herein, the terms "guest," "rider" and "occupant" may be used interchangeably to refer to an individual that may experience an amusement ride or an attraction.

Figure 1:
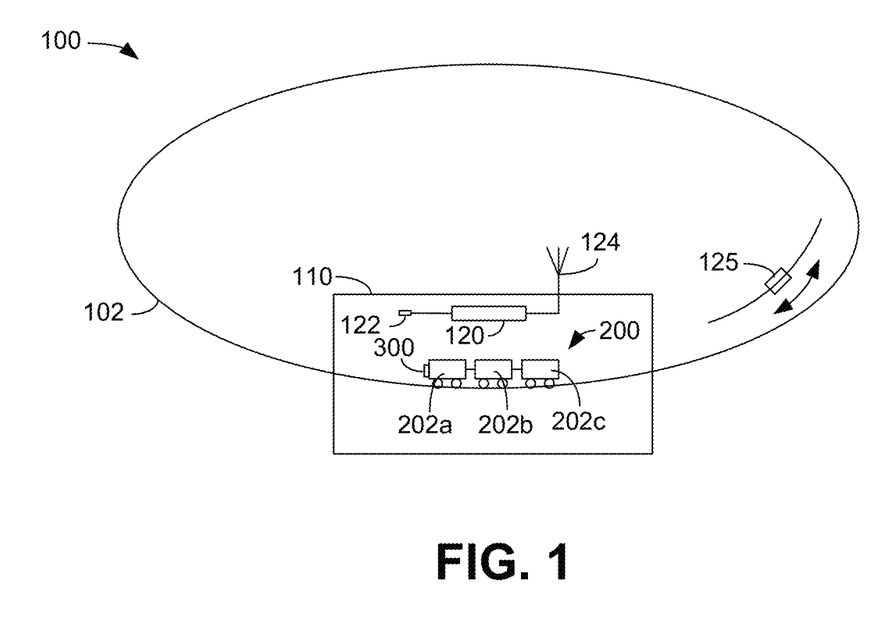
FIG. 1 is a block diagram illustrating portions of an experience capture system implemented in an amusement park ride.

FIG. 1 is a block diagram illustrating portions of an experience capture system implemented in an amusement park ride 100. An amusement park ride 100 is one example of an environment in which the experience capture system can be implemented. The amusement park ride 100 is illustrated as a roller coaster ride but can be any type of ride, experience, event or other venue in which it is desirable to capture the reaction and experience of an individual during the experience.

The amusement park ride 100 includes a train 200 that traverses a track 102. Typically, the train 200 stops at a station 110 where riders enter and leave the train 200. The amusement park ride may also include a moving ride element 125. A moving ride element 125 is an element of the ride that may move with the train 200 during portions of the ride. Such a moving ride element 125 may be adapted to move with the train 200 during certain portions of the ride such that there is little relative movement between the train 200 and the moving ride element 125 during those times. In the embodiment shown in FIG. 1, the train 200 comprises three cars, 202a, 202b and 202c. The train 200 also includes a data transfer controller 300, illustratively located on car 202c. The data transfer controller 300 collects, processes and makes available for transfer one or more data streams having multi-media data collected from various input sources located on or associated with the train 200. The multi-media data is transferred to a transceiver 120 illustratively located at the station 110. However, the transceiver 120 can be located at other places. Many different types of data can be collected during the ride experience. Examples of data that can be captured include, but are not limited to video and audio capturing the rider's experience, and additional data, such as the ambient temperature, humidity, light, acceleration, speed of the ride, etc. Further, it is possible to collect data relating to the rider, also referred to as the guest. Unique guest data can be captured using a token carried or worn by the guest to identify the guest and associate the collected data with the guest.

The data collected by the data transfer controller 300 can be transferred to the transceiver 120 located in the station 110. In accordance with an embodiment of the experience capture system, different wireless communication systems are available for the transfer of data between the data transfer controller 300 and the transceiver 120. In an embodiment, two wireless radio frequency (RF) systems can be implemented to transfer the data between the data transfer controller 300 and the transceiver 120. The two RF systems can be systems having different transfer rates and operating parameters. For example, a first RF system having a relatively high speed transfer rate can be implemented when the train 200 is located at the station 110, and a second RF system having a relatively low speed transfer rate can be continuously implemented regardless of the location of the train 200 on the track 102. Further, the term "station" can include locations where the train 200 may periodically stop or decelerate to a speed at which high speed data transfer may occur, even though the train 200 may not be located at the station at which passengers embark and disembark. Further, it is possible that elements of the ride may move with the train during portions of the ride. Such elements of the ride may be adapted to include RF capability so that although moving, there is little relative movement between the train 200 and such moving ride element, thereby allowing high speed data transfer between the train 200 and such moving ride element. The terms "high speed" and "low speed" as they relate to the transfer rate of the different RF systems is relative in that the high speed RF system transfers data at a speed higher than that of the low speed RF system.

Alternatively, the transceiver 120 can be used to transfer data to the data transfer controller 300. In an embodiment, data relating to a rider may be collected or obtained, transferred to the data transfer controller 300 and then transferred to the station 120. The data can be used to develop a customized experience, portions of which can be transferred back to the data transfer controller 300, and provided as a media experience to the rider. This data may be used to enhance or alter a rider's experience. As an example, data relating to a rider's preferences can be obtained from one or more sensors in the train 200 and/or the station 110 and can be transferred from the data transfer controller 300 to one or more processing elements (not shown) that use the rider data to develop a customized experience that can then be transferred back to the train 200 to enhance the rider's experience. The data relating to the rider can be obtained from a sensor located on the train 200, or can be obtained from one or more sensors located at the station 110.

The high speed RF system is illustratively shown in FIG. 1 using a directional antenna 122 and the low speed RF system is illustratively shown in FIG. 1 as using an omni-directional antenna 124. Data can be continually transferred using the low speed RF system via the omni-directional antenna 124 and a corresponding omni-directional antenna (not shown in FIG. 1) located in the data transfer controller 300. However, because it is contemplated that many streams of high definition (HD) video, and other bandwidth intensive information will be collected on the train 200, the high speed RF system can be used to transfer data when the train 200 is located at the station. During the time that the train 200 is at the station 110, a location sensor (not shown in FIG. 1) located in communication with the data transfer controller 300 can activate the high speed RF system and enable the higher speed transfer of data between the data transfer controller 300 and the directional antenna 122 and can disable the high speed RF system when the train 200 leaves the station 110 to minimize power consumption of the high speed RF system.

Figure 2:
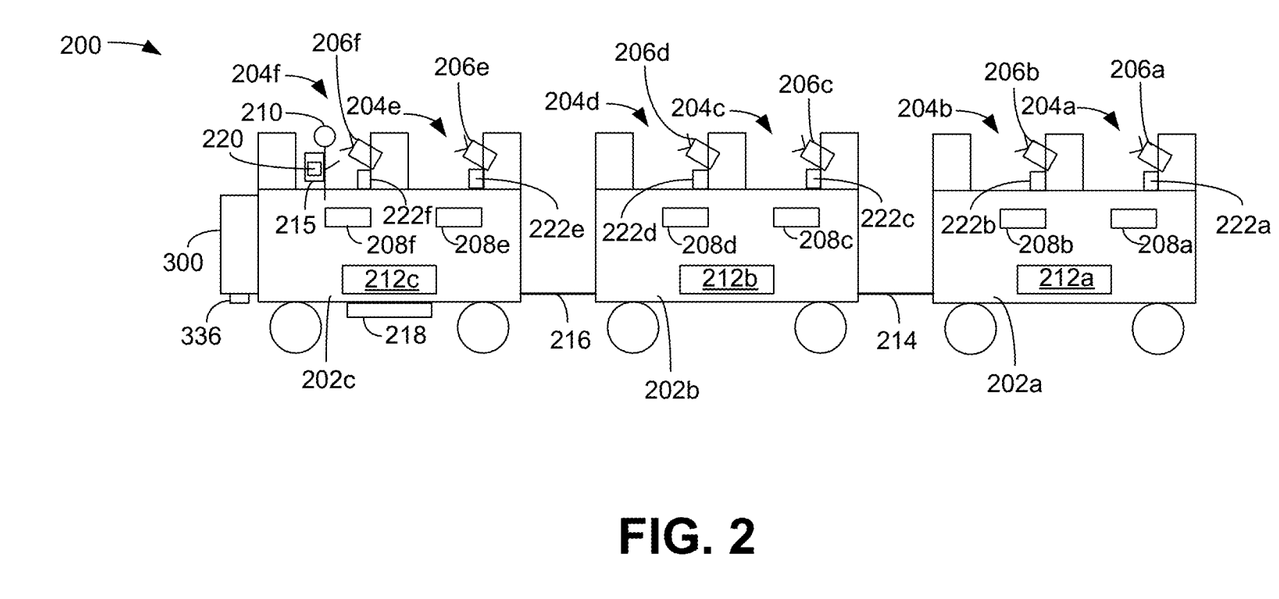
FIG. 2 is a schematic diagram illustrating the train of FIG. 1.

FIG. 2 is a schematic diagram illustrating the train 200 of FIG. 1. The train 200 includes occupant locations and a variety of data capture and display systems. The car 202a includes occupant locations 204a and 204b. The car 202a also includes a video camera 206a and a display 222a associated with occupant location 204a and a video camera 206b and display 222b associated with occupant location 204b. Each video camera may also be equipped with a microphone (not shown) to collect audio information. In some embodiments, the occupant locations 204a and 204b can each accommodate one occupant and in other embodiments, each occupant location 204a and 204b can accommodate more than one occupant. Typically, there is one camera 206 and one display 222 per occupant, but one camera and one display may also be used to capture and present video associated with more than one occupant. The train car 202a also include a data collection element 208a associated with occupant location 204a and a data collection element 208b associated with occupant location 204b. The data collection element 208 can be, for example, one or more of an RFID reader, a biometric sensor (e.g., a facial recognition element, an iris identification element, a fingerprint reader, etc.), a touch screen input device, or any other data collection element or interface capable of collecting, receiving, or having individual-specific information. A non-limiting example of the data collection element 208 is an RFID reader capable of receiving information that identifies a rider in the occupant location 204. As with the cameras 206a and 206b and the displays 222a and 222b, one or more occupants may be associated with each data collection element 208. The cameras 206, displays 222 and the data collection elements 208 can be commercially available and known in the art. The car 202a also includes a camera controller 212a to receive and process information received from the cameras 206a and 206b.

The car 202b includes occupant locations 204c and 204d. The car 202b also includes a video camera 206c and a display 222c associated with occupant location 204c and a video camera 206d and display 222d associated with occupant location 204d. Each video camera may also be equipped with a microphone (not shown) to collect audio information. In some embodiments, the occupant locations 204c and 204d can each accommodate one occupant and in other embodiments, each occupant location 204c and 204d can accommodate more than one occupant. Typically, there is one camera 206 and one display 222 per occupant, but one camera and display may also be used to capture and present video associated with more than one occupant. The train car 202b also includes a data collection element 208c associated with occupant location 204c and a data collection element 208d associated with occupant location 204d. As with the cameras 206c and 206d and displays 222c and 222d, one or more occupants may be associated with each data collection element 208. The cameras 206, displays 222 and the data collection elements 208 can be commercially available and known in the art. The car 202b also includes a camera controller 212b to receive and process information received from the cameras 206c and 206d.

The car 202c includes occupant locations 204e and 204f. The car 202c also includes a video camera 206e and display 222e associated with occupant location 204e and a video camera 206f and display 222f associated with occupant location 204f. Each video camera may also be equipped with a microphone (not shown) to collect audio information. In some embodiments, the occupant locations 204e and 204f can each accommodate one occupant and in other embodiments, each occupant location 204e and 204f can accommodate more than one occupant. Typically, there is one camera 206 and one display 222 per occupant, but one camera and display may also be used to capture and present video associated with more than one occupant. The train car 202c also includes a data collection element 208e associated with occupant location 204e and a data collection element 208f associated with occupant location 204f. As with the cameras 206e and 206f and the displays 222e and 222f, one or more occupants may be associated with each data collection element 208. The cameras 206, displays 222 and the data collection elements 208 can be commercially available and known in the art. The car 202c also includes a camera controller 212c to receive and process information received from the cameras 206e and 206f.

The car 202c includes a power source 218, such as a battery, or other power source that can be used to power the cameras 206, displays 222, data collection elements 208, camera controllers 212 and the data transfer controller 300. The car 202c also includes the data transfer system 300, and a location sensor 336. The location sensor 336 works cooperatively with a location sensor (not shown) located on the track 102 (not shown) to determine the location of the train 200 in relation to the station 110 (not shown). Although shown as being located on the car 202c, the power source 218, data transfer system 300 and the location sensor 336 can be located on other cars 202, or can be distributed among one or more of the cars 202. Further, each car 202 may include a power source 218, a data transfer system 300 and a location sensor 336.

In an embodiment in which the data collection element 208f is an RFID reader, the car 202c illustratively includes an occupant 210 having an RFID tag 215. The RFID tag 215 can include metadata 220. The occupant 210 is shown in occupant location 200f for illustrative purposes only, and can be located in any occupant location 204. When implemented using an RFID reader, the data collection element 208f can sense the presence of the RFID tag 215, and therefore, can determine information relating to the occupant 210. For example, the RFID tag 215 may include metadata 220 uniquely identifying the occupant 210. The RFID tag 215 can be, for example, a, bracelet, badge, pin, button, ticket, or another wearable or portable element. When the occupant 210 occupies the occupant location 204f, a communication link is established between the data collection element 208f and the RFID tag 215. The data collection element 208f and the RFID tag 215 can be part of any RFID system that can recognize the metadata 220 associated with the RFID tag 215. The metadata 220 can include unique guest identification information, likes and dislikes of the occupant 210, or any other information associated with the occupant 210. The metadata 220 can be associated with the data captured by the data transfer controller 300 and presented to the guest at the exit of the attraction. Alternatively, the metadata 220 relating to the occupant 210 can be obtained when the occupant 210 enters the occupant location 204 and can be transferred to the transceiver 120 (FIG. 1). The metadata 220 can be used to identify the occupant 210 and, in an embodiment, generate a customized experience which can be used to alter or customize the attraction for that occupant including, but not limited to, enhancing the occupant's experience during the ride by altering the path, trajectory, and/or other aspects of the movement of the vehicle, providing visual displays that can be provided to the rider during the ride, etc.

The cameras 206 can be adapted to capture standard definition and/or high definition (HD) video and audio. The video and audio can be transferred wirelessly or through a wired connection to a respective camera controller 212. A wireless connection can comprise an RF connection, an infrared (IR) connection, or another wireless connection. The data from the camera controller 212 can be transferred wirelessly or through a wired connection to the data transfer controller 300. Each car is coupled by a connection having a data transfer capability. For example, car 202a is coupled to car 202b via connection 214. In an embodiment, the connection 214 can include a mechanical coupling between the cars 202a and 202b, and can include an electrical coupling comprising one or more wires, optical fiber or other connection means to allow communication from the camera controller 212a and the data collection elements 208a and 208b to the data transfer controller 300. Alternatively, a wireless communication link can be established between and among the camera controller 212a, the data collection elements 208a and 208b, and the data transfer controller 300. The connection 216 between cars 202b and 202c can be a connection similar to the connection 214, so that information collected by the cameras 206c and 206d, the data collection elements 208c and 208d, and the camera controller 212b can be transferred to the data transfer controller 300.

Figure 3:
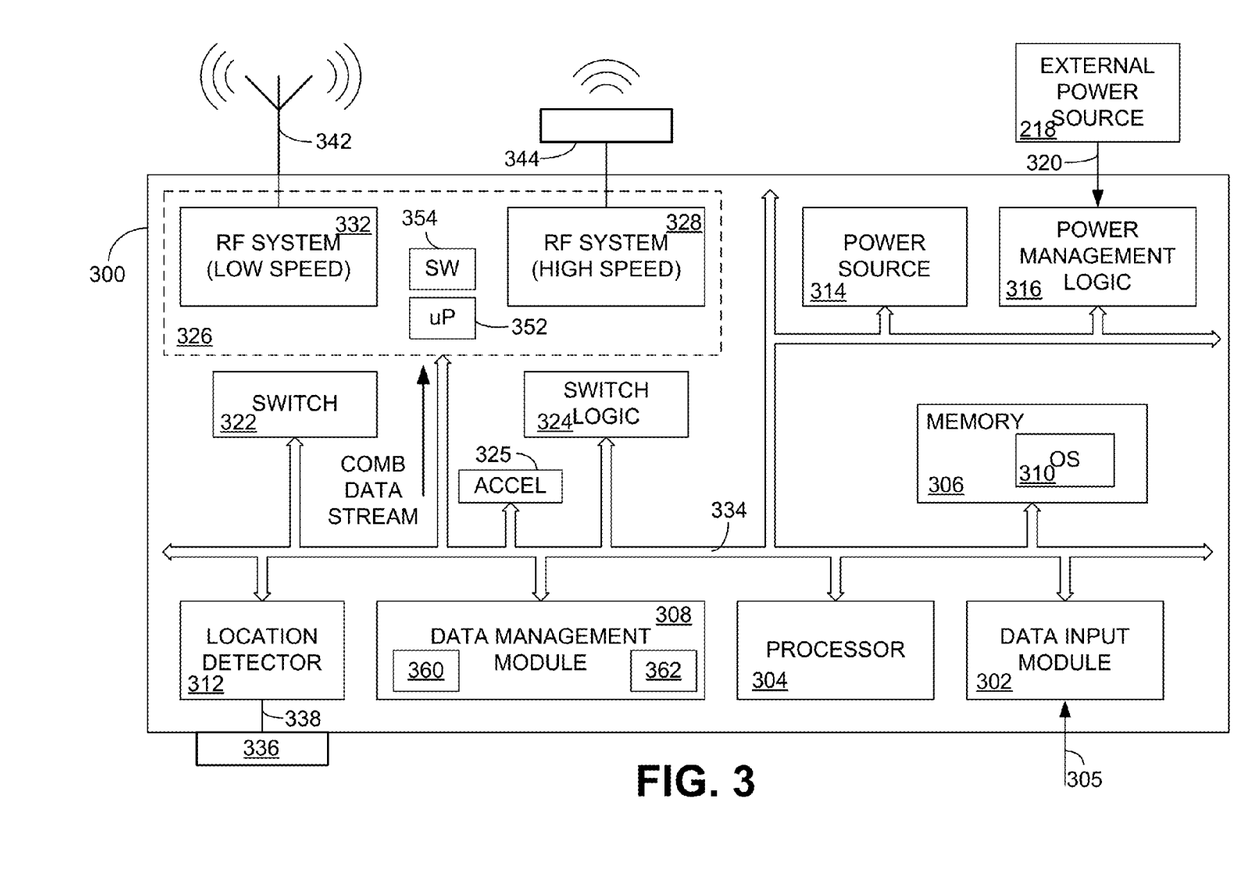
FIG. 3 is a functional block diagram illustrating an embodiment of the data transfer controller of FIGS. 1 and 2.

FIG. 3 is a functional block diagram illustrating an embodiment of the data transfer controller 300 of FIGS. 1 and 2. The data transfer controller 300 comprises a combination of software modules and hardware elements coupled over a system bus 334. The system bus 334 can be any physical and logical communication bus that allows bidirectional communication between and among the connected modules and elements. A data input module 302 receives one or more data streams over connection 305. The data streams can comprise HD video, audio, ambient information such as temperature, humidity, light, data collection element data, RFID reader data, metadata, and any other data provided to the data transfer controller 300 by the cameras 206 (FIG. 2), data collection elements 208 (FIG. 2) and camera controllers 212 (FIG. 2).

The data transfer controller 300 also comprises a processor 304 and a memory 306. The memory 306 can be read only memory (ROM), random access memory (RAM), static memory, dynamic memory, volatile memory, nonvolatile memory, distributed memory, or any other type of memory. The memory 306 also includes an operating system 310 associated with the processor 304. The operating system 310 can comprise one or more software modules comprising instructions used by processor 304 to control the operation of the data transfer controller 300.

The data transfer controller 300 also comprises a location detector 312, a data management module 308, a switch 322, and switch logic 324. The location detector 312 is operatively coupled over connection 338 to a location sensor 336. The location sensor 336 may operate independently, or may operate cooperatively with a reciprocal location sensor (not shown) located on the track 102, the station 110, or otherwise in cooperative relation to the data transfer controller 300. The location sensor 336 can be a mechanical device, an electrical device, an optical device, or any other location sensor device. The location detector 312 and the location sensor 306 determine when the data transfer controller 300 is located at a particular location, such as at the station 110. The data transfer controller 300 also includes an accelerometer 325. The accelerometer 325 can be used to detect movement of the data transfer controller 300, and therefore, can determine whether the train 200 is stopped or is in motion.

The data management module 308 controls, organizes, processes, and otherwise formats the data received by the data input module 302. The data management module 308 provides a combined data stream that can be in serial format or in parallel format and that can be converted to analog format and transferred from the data transfer controller 300 to the receiver 120 (FIG. 1).

The data transfer controller 300 also comprises an RF unit 326. The RF unit 326 can comprise a variety of systems that can receive the combined data stream from the data management module 308 and transmit the data stream over an RF communication link. In the embodiment described, the RF unit 326 comprises a high speed RF system 328 and a low speed RF system 332. Although shown as having separate RF systems, the RF unit 326 can comprise a single RF system capable of both high speed and low speed operation. The low speed RF system 332 is a relatively low speed communication system that can use an omni-directional antenna 342 to allow communication between the data transfer controller 300 and the receiver 120 continually, regardless of the location of the train 200 on the track 102. The high speed RF system 328 uses a directional antenna 344 to provide a communication link between the data transfer controller 300 and the receiver 120 when the train 200 is located at a particular location, such as at the station 110. In an embodiment, the RF unit 326 includes a secondary processor 352 and a secondary switch 354. In an embodiment, the processor 304 can be referred to as a "main processor" and can control the secondary processor 352 within the RF unit 326 to enable or disable the high speed RF system 328 and the low speed RF system 332 independently depending on the location of the data transfer controller 300 in proximity to other RF units along the vehicle path. When either or both of the low speed and high speed RF systems are active and transmitting, the secondary processor 352 and the secondary switch 354 within the RF unit 326 have the ability to enable link aggregation on the available RF interfaces, sometimes referred to as "RF bonding," thereby being able to combine the high speed RF system 328 and the low speed RF system 332 to provide a single higher capacity RF system. In such an embodiment, the RF unit 326 presents one connection "pipe" to the rest of the onboard system.

Depending on its operating mode (commanded by the main processor 304), the data transfer controller 300 will have varying amounts of bandwidth available. The data management module 308 may be programmed to limit transferring data to certain modes, or may opportunistically send as much data to the RF unit 326 as it can handle.

As described above, there are certain circumstances when it is desirable to have the ability to use the high speed RF system 328 to transfer data using the directional antenna 344 in addition to using the low speed RF system 332. The switch 322 and the switch logic 324 operate to control whether the high speed RF system 328, the low speed RF system 332, or both RF systems 328 and 332 are operative. In addition to location or movement sensing, the switch logic 324 can be responsive to an ability of the high speed RF system 328 to detect the availability of a high speed network. For example, when the high speed RF system 328 detects the presence of a high speed network, the switch logic 324 can cause the switch 322 to allow data transfer between the data transfer controller 300 and the receiver 120 as long as the high speed network is available. Further, the switch logic 324 can cause the switch 322 to control whether the high speed RF system 328, the low speed RF system 332, or both RF systems 328 and 332 are operative based on a timing methodology, such as that implemented in an amusement attraction show controller (not shown), or on another changeable parameter. Such a changeable parameter may be location, as described above, or can be based on, for example, time since the train 200 left the platform, or another time related parameter. Additional embodiments include, for example, switching between the high speed RF system 328, the low speed RF system 332, or both RF systems 328 and 332 based on speed, or another changeable parameter that may affect the available bandwidth.

The data transfer controller 300 also comprises a power source 314 and power management logic 316. The power source 314 can be a battery, a rechargeable battery, a solar power source, a capacitive power source, a power source that captures regenerative braking energy or any other device for providing power to the data transfer controller 300. Further, an external power source 218 (FIG. 2) can be coupled to the power management logic 316 over connection 320. The power management logic 316 operates to control and regulate the power consumed by the data transfer controller 300, depending on which RF system is operative.

The power management logic 316 can operate to conserve power by opportunistically placing elements of the system into a low power, or stand-by state. For example, the high-speed RF unit 328 can be placed into a stand-by mode when there is no opportunity for high speed data transfer, or the cameras 206 (FIG. 2), or other sensors, can be placed into stand-by mode when they are not operating. In addition, it can also be implemented to manage a multiple input external power source 218.

In accordance with an embodiment of the system and method for multi-media experience capture and data transfer, when the location detector 312 or the accelerometer 325 determines that the data transfer controller 300 is located at the station 110, the switch logic 324 instructs to switch 322 to activate the high speed RF system 328, to enable high speed data communication between the data transfer controller 300 and the receiver 120 (FIG. 1). Alternatively, when the high speed RF system 328 determines that it is in range of a high speed communication network, the switch logic 324 instructs to switch 322 to activate the high speed RF system 328, to enable high speed data communication between the data transfer controller 300 and the receiver 120 (FIG. 1). When the location detector 312 or the accelerometer 325 determines that the data transfer controller 300 has departed from the station 110, the switch logic 324 instructs the switch 322 to disable the high speed RF system 328, so that power can be saved. Alternatively, when the high speed RF system 328 determines that it is no longer in range of a high speed communication network, the switch logic 324 instructs to switch 322 to deactivate the high speed RF system 328, to disable high speed data communication between the data transfer controller 300 and the receiver 120 (FIG. 1). However, the low speed RF system 332 can remain operational continuously, thereby allowing continuous data transfer from the data transfer controller 300 to the receiver 120. Depending on the implementation, certain types of data can be communicated using the low speed RF system 332, while other types of data can be communicated using the high speed RF system 328. In an embodiment, the combined data stream can be divided so as to provide high-definition (HD) video and accompanying audio to be transferred using the high speed RF system 328 while the train 200 is located at the station 110, while less bandwidth intensive data can be continually transferred from the data transfer system 300 using the low speed RF system 332. However, in other embodiments, the combined data stream can be formatted so that the combined data stream can be transferred using both the high speed RF system 328 and the low speed RF system 322, whereby the combined data stream is partitioned to both the high speed RF system 328 and the low speed RF system 332 while the train 200 is in the station 110, and then directed only to the low speed RF system 332 when the train 200 is no longer at the station 110. Alternatively, when both the low speed and high speed RF systems are active and transmitting, the secondary processor 352 and the secondary switch 354 within the RF unit 326 have the ability to enable link aggregation, thereby being able to combine the bandwidth available from the high speed RF system 328 and the low speed RF system 322.

The RF unit 326 acts as a variable bandwidth pipeline and does not discriminate in terms of the data that is sent through it. The data management module 308 operates in conjunction with the RF unit 326 to send the appropriate data stream during the appropriate operating mode. The data management module 308 can send a serial data stream or a parallel data stream to the RF unit 326, thereby managing the formatting of the data stream or streams. In an embodiment, it has been determined that aggregate throughput is greater when using parallel data streams than serial data streams. As a non-limiting example, the data may comprise a continuous low-bandwidth telemetry stream that reports operating parameters, such as battery voltage, temperature, accelerometer data, or even metrics regarding vehicle performance that may be helpful for operations or maintenance. The telemetry stream can run continuously as user datagram protocol (UDP) packets, with no regard to dropped data. Simultaneously, video data can be stored to one or more files 360 that are transferred only when complete via transmission control protocol (TCP) packets with checksum protection to ensure that all data is transmitted successfully. It is also possible that video data could be saved to a linear "first in/first out" (FIFO) buffer 362, and the data management module 308 handle continuous streaming of the data, so that video data from the beginning of a ride could be streaming even before the ride has finished. The buffer 362 could be emptied at a variable speed as the available bandwidth through the RF unit 326 changes. In such an embodiment, low-bandwidth telemetry data can stream continuously, but in parallel, six FIFO buffers having video data from the six cameras on a train can transfer simultaneously. Data flows across the low-bandwidth low speed RF system 332 (emptying the queue more slowly) in some portions of the ride, and flows across the high-bandwidth high speed RF system 328 in others (emptying the queue faster). In an embodiment, all data may flow to the data management module 308 before being transferred. In another embodiment, the data management function could be distributed across the various camera controllers (212a-c), and managed by the main processor 304.

Figure 4:
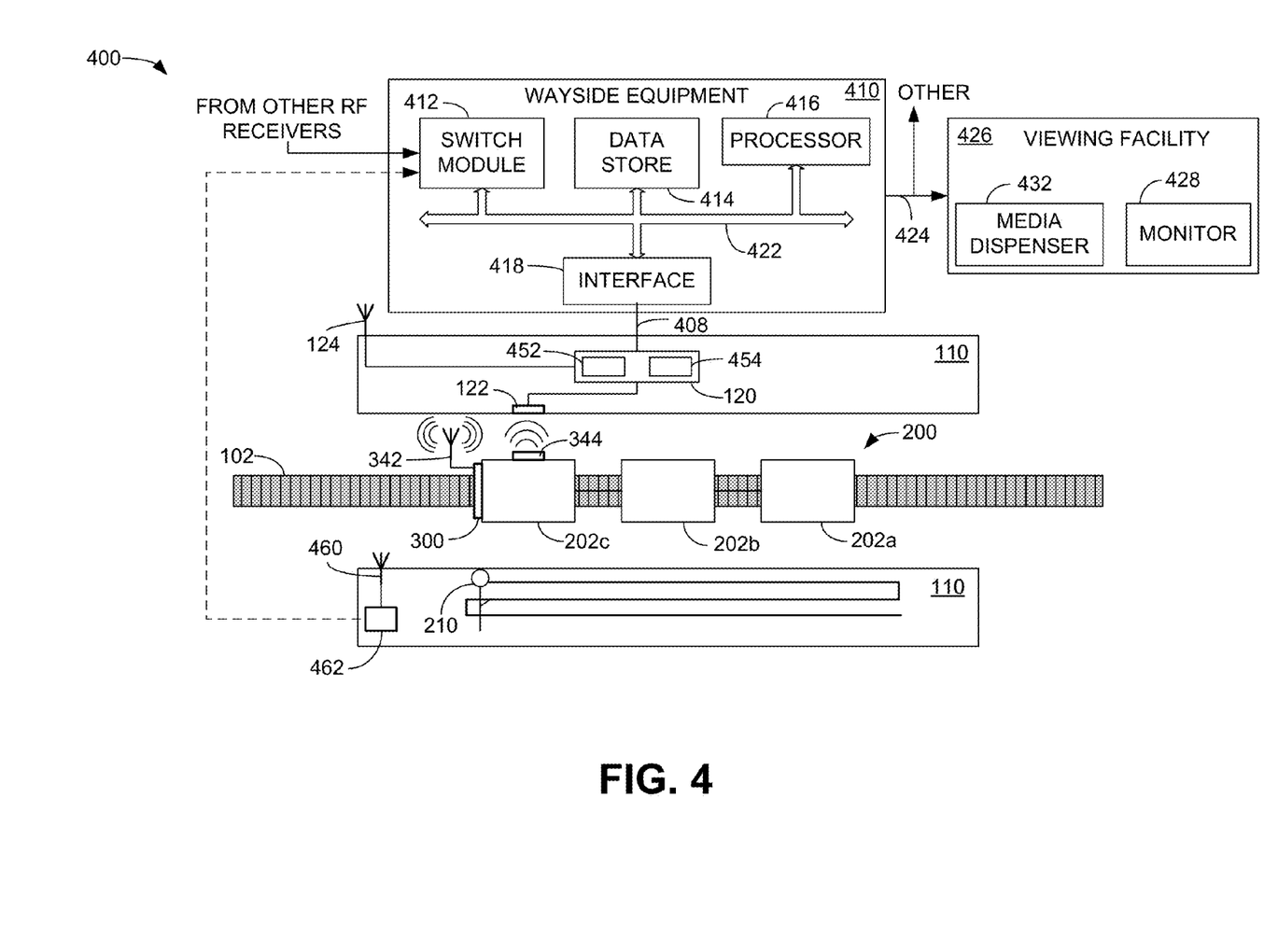
FIG. 4 is a block diagram illustrating an embodiment of an amusement ride exit environment.

FIG. 4 is a block diagram illustrating an embodiment of an amusement ride exit environment 400. The amusement ride exit environment 400 includes the station 110 through which the track 102 runs. The train 200 is located at the station 110. While at the station 110, the data transfer controller 300 uses the high speed RF system 328 (FIG. 3), via the directional antenna 344, to transfer data to the transceiver 120 via the directional antenna 122. The data transfer controller 300 also uses the low speed RF system 332 (FIG. 3), via the omni-directional antenna 342, to transfer data to the transceiver 120 via the omni-directional antenna 124. In an embodiment in which an aggregated RF system is available, the transceiver 120 comprises a secondary processor 452 and a secondary switch 454, which are complementary to the secondary processor 352 and secondary switch 354 in the RF unit 326. The secondary processor 452 and a secondary switch 454 can be used when an aggregated RF communication link is established.

The transceiver 120 is operably coupled to a wayside equipment module 410. The wayside equipment module 410 comprises a switch module 412, a data store 414, a processor 416 and an interface 418 coupled over a system bus 422. The switch module 412 is adapted to control the reception of data from one or more transceivers or sensors. The interface 418 receives all of the transferred data from the transceiver 120 over connection 408 and transfers the data to the data store 414. The connection 408 can be a wired or a wireless connection. The processor 416 combines the video and audio data and any metadata, formats the combined data and then makes the formatted data available for local or remote usage over connection 424.

In an embodiment, the station 110 may have one or more sensors 460 configured to collect metadata from an occupant 210 waiting to enter the train 200. As an example, an occupant 210 may have an RFID tag 215 having metadata 220 as described above. A sensor 460 can be configured to read the metadata 220 and forward the metadata via a transceiver 462 to the switch module 412. The metadata 220 can be provided to the processor 416, which may use the metadata to generate a customized experience for the occupant 210. Portions of the customized experience may be transferred back to the data transfer controller 300 and be provided to the occupant 210 as part of an enhanced experience and can also be used to alter or enhance the movement of the train 200 according to preferences or other information contained in the metadata 200.

In an embodiment, the combined data on connection 424 is provided to a viewing facility 426. The viewing facility 426 comprises a monitor 428 and a media dispenser 432. In an embodiment, the monitor 428 can be viewed by an occupant exiting the train 200 to view their captured experience. The media dispenser 432 can be a self-service kiosk, a served counter, or any other way of dispensing a media element on which the multi-media experience is stored.

Alternatively, the combined data on connection 424 can be transferred from the attraction location for further processing or consumption. As an example, the combined data on connection 424 can be saved in a persistent memory device for long-term storage, can be converted to other forms or combinations having data from other locations, or can be saved for later viewing by the guest using, for example, the world wide web, a mobile phone, a kiosk, a television at a room at a resort, etc.

Figure 5:
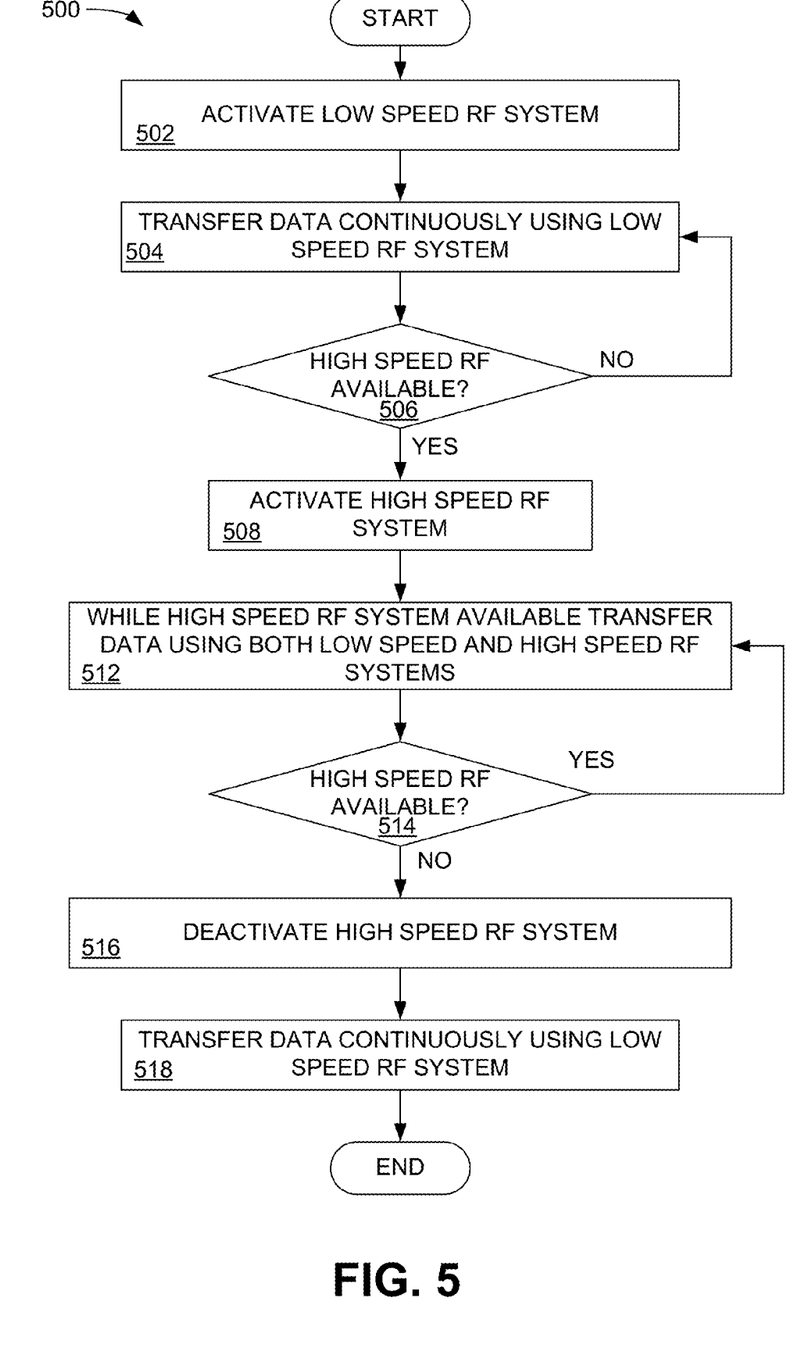
FIG. 5 is a flow chart illustrating an embodiment of a method for operating the data transfer controller of FIG. 3.

FIG. 5 is a flow chart illustrating an embodiment of a method for operating the data transfer controller 300 of FIG. 3. In block 502, the low speed RF system 332 is activated and allows data transfer between the data transfer controller 300 and the transceiver 120, regardless of the location of the train 200 (FIG. 1) on the track 102 (FIG. 1). In an embodiment, the low speed RF system 332 can remain operational continuously.

In block 504, the low speed RF system 332 continuously allows data transfer between the data transfer controller 300 and the transceiver 120 (FIG. 1). In block 506 it is determined whether the data transfer controller 300 is located at the station 110, at another location at which high speed data transfer can occur, or has slowed to a speed at which high speed data transfer can occur. If the data transfer controller 300 is not located at the station 110, or at another location at which high speed data transfer can occur, then the process returns to block 504. If, however, it is determined in block 506 that the data transfer controller 300 is located at the station 110, or at another location at which high speed data transfer can occur, then, in block 508, the switch logic 324 and the switch 322 activate the high speed RF system 328 (FIG. 3).

In block 512, and while the data transfer controller 300 is located in range of a high speed RF system, the high speed RF system 328 communicates with the transceiver 120 while the low speed RF system 332 continues to communicate with the transceiver 120. In some applications, it is possible to "aggregate" the high speed RF system 328 and the low speed RF system 332 to increase bandwidth, as described above. In block 514 it is determined whether the data transfer controller 300 is still located at a location at which the high speed RF system 328 is available. If, in block 514 it is determined that the data transfer controller 300 is located at a location at which the high speed RF system 328 is available, then the process returns to block 512. If, however, it is determined in block 514 that that the data transfer controller 300 is no longer located at a location at which the high speed RF system 328 is available, then, in block 516, the switch logic 324 and the switch 322 deactivate the high speed RF system 328. In block 518, the low speed RF system 332 continuously transmits data from the data transfer controller 300 to the receiver 120.

Figure 6A:
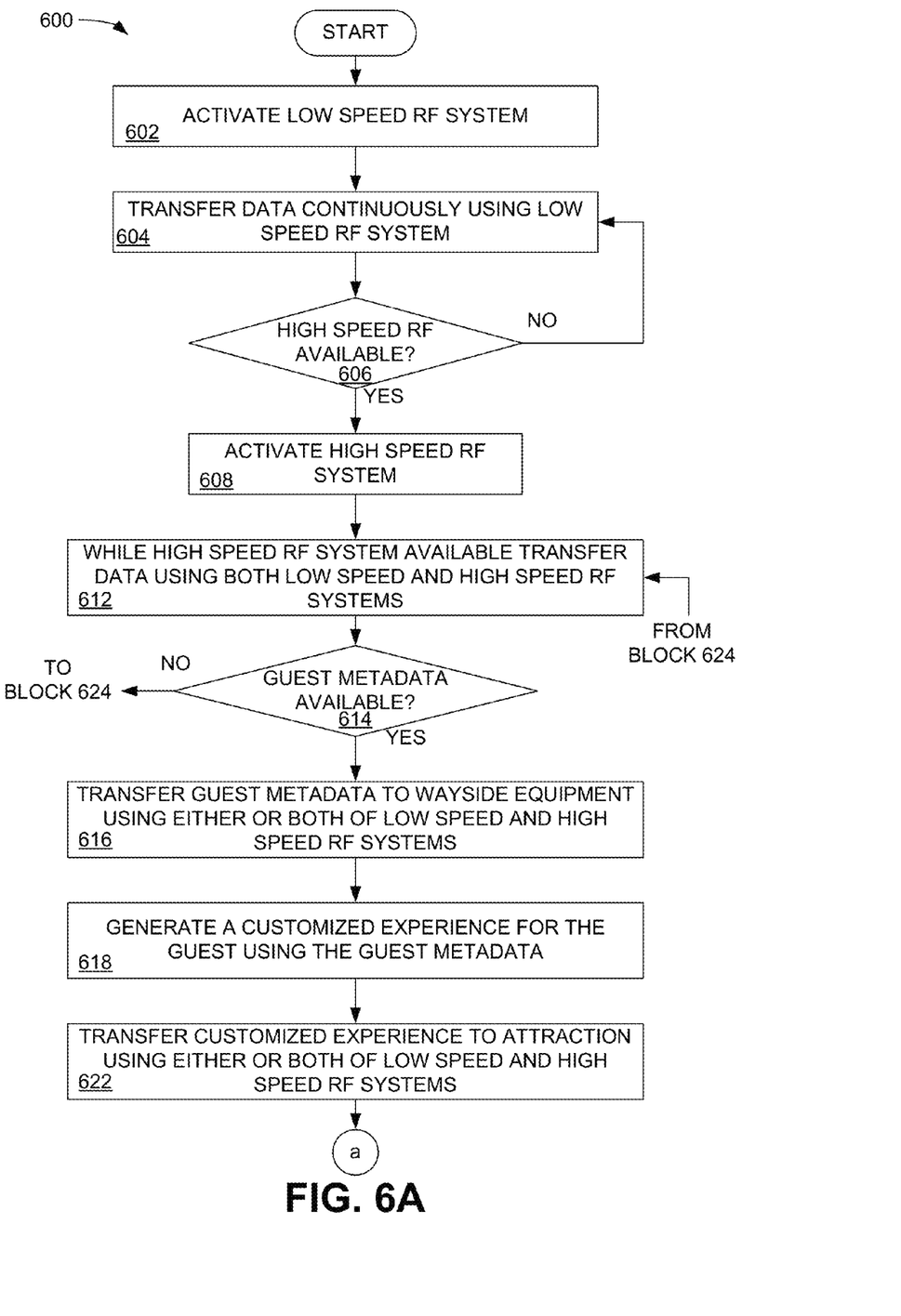
FIGS. 6A and 6B are a flow chart collectively illustrating an alternative embodiment of a method for operating the data transfer controller of FIG. 3.
Figure 6B:
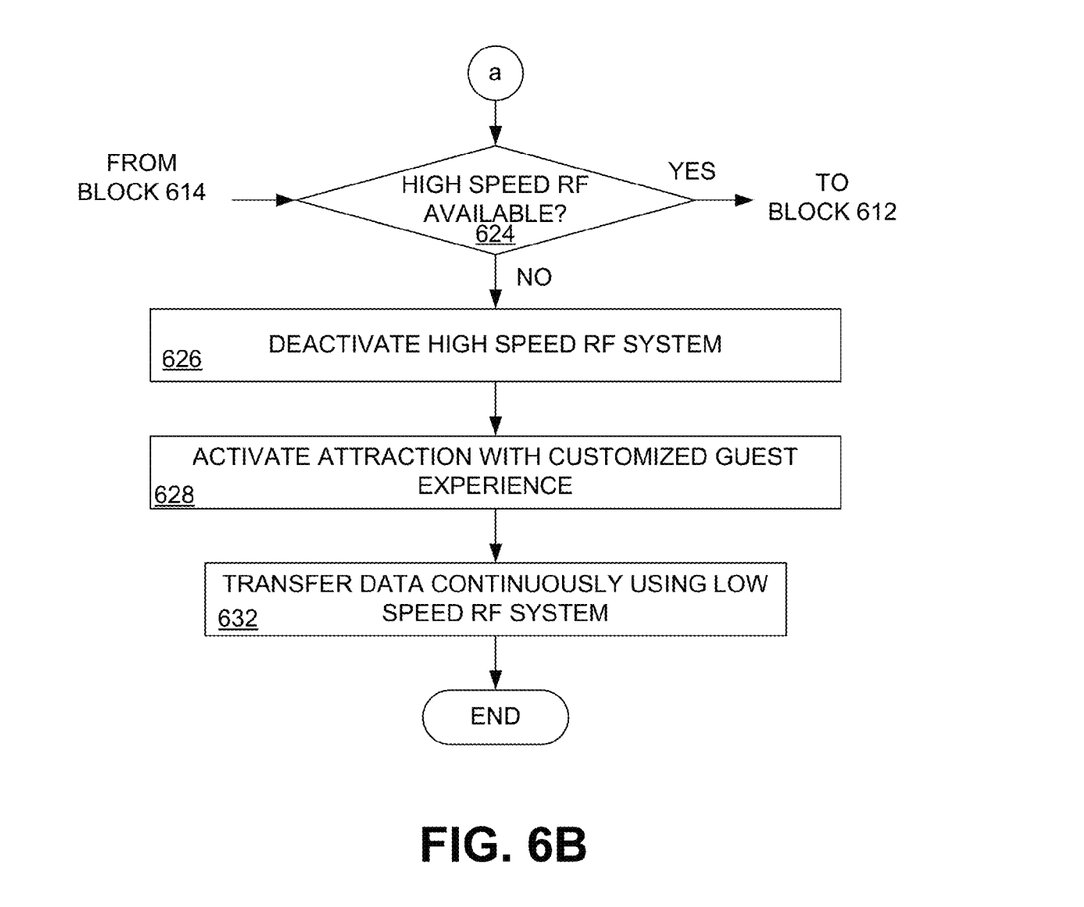

FIGS. 6A and 6B are a flow chart collectively illustrating an alternative embodiment of a method for operating the data transfer controller 300 of FIG. 3. In block 602, the low speed RF system 332 is activated and allows data transfer between the data transfer controller 300 and the transceiver 120, regardless of the location of the train 200 (FIG. 1) on the track 102 (FIG. 1). In an embodiment, the low speed RF system 332 can remain operational continuously.

In block 604, the low speed RF system 332 continuously allows data transfer between the data transfer controller 300 and the transceiver 120 (FIG. 1). In block 606 it is determined whether the data transfer controller 300 is located at a location at which high speed data transfer can occur. In this embodiment, it is anticipated that the location would be the station 110. If the data transfer controller 300 is not located at a location at which high speed data transfer can occur, then the process returns to block 604. If, however, it is determined in block 606 that the data transfer controller 300 is located at the station 110, or at another location at which high speed data transfer can occur, then, in block 608, the switch logic 324 and the switch 322 activate the high speed RF system 328 (FIG. 3).

In block 612, and while the data transfer controller 300 is located in range of a high speed RF system, the high speed RF system 328 communicates with the transceiver 120 while the low speed RF system 332 continues to communicate with the transceiver 120. In some applications, it is possible to "aggregate" the high speed RF system 328 and the low speed RF system 332 to increase bandwidth, as described above.

In block 614 it is determined whether metadata relating to a guest is available. For example, in an embodiment, metadata 220 relating to the occupant 210 can be obtained when the occupant 210 enters the occupant location 204 and can be transferred to the transceiver 120. Alternatively, the station 110 may have one or more sensors 460 configured to collect metadata from an occupant 210 waiting to enter the train 200. As an example, an occupant 210 may have an RFID tag 215 having metadata 220 as described above. A sensor 460 can be configured to read the metadata 220 and forward the metadata via a transceiver 462 to the switch module 412. If it is determined in block 614 that no metadata relating to a guest is available, then the process proceeds to block 624.

In block 616, the metadata 220 is transferred to the wayside equipment 410 using either or both of the high speed RF unit 328 and the low speed RF unit 332.

In block 618, the metadata 220 is used to generate a customized experience which can be used to alter or customize the attraction for that occupant including, but not limited to, enhancing the occupant's experience during the ride by altering the path of the vehicle, providing visual displays that can be provided to the rider during the ride, etc.

In block 622, all or portions of the customized experience may be transferred back to the data transfer controller 300 and be provided to the occupant 210 as part of an enhanced experience.

In block 624, it is determined whether the data transfer controller 300 is still located at a location at which the high speed RF system 328 is available. If, in block 624 it is determined that the data transfer controller 300 is located at a location at which the high speed RF system 328 is available, then the process returns to block 612. If, however, it is determined in block 624 that that the data transfer controller 300 is no longer located at a location at which the high speed RF system 328 is available, then, in block 626, the switch logic 324 and the switch 322 deactivate the high speed RF system 328.

In block 628, the attraction is activated with the customized guest experience.

In block 632, the low speed RF system 332 continuously transmits data from the data transfer controller 300 to the receiver 120.

While various embodiments of the invention have been described, it will be apparent to those of ordinary skill in the art that many more embodiments and implementations are possible that are within the scope of the invention.

What is claimed is:

1. A system for transferring data relating to a captured experience, comprising:
   a first wireless communication system located on a moveable amusement attraction, wherein the first wireless communication system generates directional transmissions to effectuate a directional communication link;
   a second wireless communication system located on the moveable amusement attraction, wherein the second wireless communication system generates omni-directional transmissions to effectuate an omni-directional communication link; and
   one or more physical processors configured by computer-readable instructions to operate the first wireless communication system and the second wireless communication system based on a changeable parameter of the moveable amusement attraction,
   wherein the one or more physical processors are further configured by computer-readable instructions to:
   obtain metadata associated with an individual;
   effectuate transmission of the metadata to a second physical processor that is remote from the one or more physical processors, wherein the second physical processor is configured to determine a customized quest experience using the metadata, the customized quest experience relating to the operation of the moveable amusement attraction;
   receive the determined customized experience relating to the operation of the moveable amusement attraction from the second physical processor; and
   operate the moveable amusement attraction according to the customized quest experience.

2. The system of claim 1, wherein the one or more physical processors are configured by computer-readable instructions to operate the first wireless communication system only when the moveable amusement attraction is in a predetermined location.

3. The system of claim 2, wherein the one or more physical processors are configured by computer-readable instructions to operate the second wireless communication system regardless of the location of the moveable amusement attraction.

4. The system of claim 3, wherein the first wireless communication system is configured to effectuate transmissions of a first data stream and the second wireless communication system is configured to effectuate transmissions of a second data stream, wherein the first data stream is different from the second data stream.

5. The system of claim 4, wherein the first wireless communication system and the second wireless communication system are incorporated into a single RF system, wherein the single RF system is configured to effectuate transmission of a third data stream that is an aggregate of the first data stream and the second data stream.

6. The system of claim 5, wherein the third data stream comprises a continuous telemetry stream and a video stream.

7. The system of claim 6, wherein the continuous telemetry stream comprises operating parameters chosen from battery voltage, temperature, accelerometer data, and metrics relating to performance of the moveable amusement attraction.

8. The system of claim 6, wherein the video stream is buffered and continuously streamed.

9. The system of claim 1, wherein the metadata is obtained from a reader included on the moveable amusement attraction.

10. The system of claim 1, wherein the second physical processor is configured to obtain the metadata from a reader at the predetermined location.

11. The system of claim 1, wherein at least portions of the customized guest experience are presented to the individual on the moveable amusement attraction.

12. The system of claim 1, wherein at least portions of the customized guest experience are used to alter at least one aspect of the moveable amusement attraction.

13. A system for transferring data relating to a captured experience, comprising:
a moveable amusement attraction having a first wireless communication system and a second wireless communication system, wherein the first wireless communication system generates directional transmissions to effectuate a directional communication link, and the second wireless communication system generates omni-directional transmissions to effectuate an omni-directional communication link; and
a data transfer controller located on the moveable amusement attraction, the data transfer controller configured to collect data relating to a captured experience of an occupant of the moveable amusement attraction and transfer the collected data from the moveable amusement attraction using the first wireless communication system and the second wireless communication system based on a location of the moveable amusement attraction,
wherein the data transfer controller comprises one or more physical processors configured by computer-readable instructions to:
obtain metadata associated with an individual;
effectuate transmission of the metadata to a second physical processor that is remote from the one or more physical processors, wherein the second physical processor is configured to determine a customized quest experience using the metadata, the customized quest experience relating to the operation of the moveable amusement attraction;
receive the determined customized experience relating to the operation of the moveable amusement attraction from the second physical processor; and operate the moveable amusement attraction according to the customized quest experience.

14. The system of claim 13, wherein the collected data is chosen from high definition (HD) video and audio, ambient temperature, ambient light, ambient humidity, and data related to an individual that experiences the moveable amusement attraction.

15. The system of claim 13, wherein the data transfer controller is configured to operate the first wireless communication system only when the moveable amusement attraction is in a predetermined location and operate the second wireless communication system regardless of the location of the moveable amusement attraction.

16. The system of claim 15, wherein the first wireless communication system and the second wireless communication system each transmit a different data stream.

17. The system of claim 15, wherein the first wireless communication system and the second wireless communication system each transmit portions of the same data stream.

18. A method for transferring data relating to a captured experience, comprising:
collecting data relating to a captured experience of an occupant located on a moveable amusement attraction;
transferring the collected data from the moveable amusement attraction using a first wireless communication system and a second wireless communication system based on a location of the moveable amusement attraction, wherein the first wireless communication system generates directional transmissions to effectuate a directional communication link, and the second wireless communication system generates omni-directional transmissions to effectuate an omni-directional communication link,
obtaining metadata associated with an individual;
effectuating transmission of the metadata to a second physical processor that is remote from the one or more physical processors, wherein the second physical processor is configured to determine a customized quest experience using the metadata, the customized quest experience relating to the operation of the moveable amusement attraction;
receiving the determined customized experience relating to the operation of the moveable amusement attraction from the second physical processor; and
operating the moveable amusement attraction according to the customized quest experience.

19. The method of claim 18, wherein the collected data is chosen from high definition (HD) video and audio, ambient temperature, ambient light, ambient humidity, and data related to an individual that experiences the moveable amusement attraction.

20. The method of claim 19, further comprising:
transferring a portion of the collected data using the directional communication link; and
transferring a different portion of the collected data using the omni-directional communication link.

21. The method of claim 20, further comprising:
operating the first wireless communication system only when the moveable amusement attraction is in a predetermined location; and
operating the second wireless communication system regardless of the location of the moveable amusement attraction.

* * * * *